US008693944B2

(12) United States Patent
Stiscia et al.

(10) Patent No.: US 8,693,944 B2
(45) Date of Patent: Apr. 8, 2014

(54) METHOD AND APPARATUS OF PERFORMING VIDEO PROGRAMMING SECURITY CONTROL

(75) Inventors: James J. Stiscia, Garner, NC (US); Randall B. Sharpe, Chapel Hill, NC (US)

(73) Assignee: Alcatel Lucent, Paris (FR)

( * ) Notice: Subject to any disclaimer, the term of this patent is extended or adjusted under 35 U.S.C. 154(b) by 258 days.

(21) Appl. No.: 13/232,060

(22) Filed: Sep. 14, 2011

(65) Prior Publication Data

US 2012/0196525 A1 Aug. 2, 2012

Related U.S. Application Data

(60) Provisional application No. 61/437,450, filed on Jan. 28, 2011.

(51) Int. Cl.
*H04K 3/00* (2006.01)
*H04W 12/00* (2009.01)

(52) U.S. Cl.
USPC ............... 455/1; 455/26.1; 455/528; 455/522

(58) Field of Classification Search
USPC ............... 455/1, 26.1, 62, 522, 69, 528, 63.1, 455/67.13; 380/209, 205, 206, 208; 375/130, 132, 219
See application file for complete search history.

(56) References Cited

U.S. PATENT DOCUMENTS 5,287,539 A * 2/1994 West, Jr. ........................... 455/1
5,303,295 A * 4/1994 West et al. .................... 380/208

* cited by examiner

*Primary Examiner* — John J Lee
(74) *Attorney, Agent, or Firm* — RGIP LLC

(57) ABSTRACT

Disabling data channels at a customer premises provides, in one embodiment, generating at least one jamming signal and inserting the at least one jamming signal at a first frequency to jam at least one carrier frequency channel. The jamming signal may be hopped to at least one additional frequency different from the first frequency to jam at least one additional carrier frequency channel.

14 Claims, 5 Drawing Sheets

METHOD AND APPARATUS OF PERFORMING VIDEO PROGRAMMING SECURITY CONTROL

CROSS REFERENCE TO RELATED APPLICATIONS

This application claims benefit to provisional application No. 61/437,450, entitled "Method And Apparatus For Video Programming Security Control", filed on Jan. 28, 2011, the entire contents of which are hereby incorporated by reference.

TECHNICAL FIELD

This application relates to a method and apparatus of disabling data channels at a customer premises by inserting jamming signals into existing signal channels.

BACKGROUND

Disabling television channels is an important part of the cable television business structure. Within the realm of passive optical networks (PONs), all of the available television channels may be made available by an optical line terminal (OLT) unit. The user premises may have an optical network termination unit (ONT) that receives the television channels subscribed to the user's household premises. Limiting the television channel lineup may be performed at the OLT, the ONT or a combination of both ends of the PON.

One approach to channel access prevention or channel blocking is a brute force approach including, for example, channel tier filtering (i.e., complete tier pass or tier block) and jamming carriers on each specific television (TV) channel. This approach is inflexible regarding individual or discrete channel blocking. Another example may include the ONT (PON customer device) being capable of disabling video channels that are provided via a coaxial output to customer's premises. Ideally, individual television channel control could be performed which provides increased flexibility in the channel line-up provided to a given customer.

SUMMARY

One example embodiment may provide a method of disabling data channels at a customer premises. The method may include generating at least one jamming signal, and inserting the at least one jamming signal at a first frequency to jam at least one carrier frequency channel. The method may also include hopping the at least one jamming signal to at least one additional frequency different from the first frequency to jam at least one additional carrier frequency channel.

Another example embodiment may include an apparatus configured to disable data channels at a customer premises. The apparatus may include a frequency synthesizer configured to generate at least one jamming signal and an amplifier configured to increase a power level of the jamming signal. The apparatus may also include a transmitter configured to transmit the at least one jamming signal at a first frequency to jam at least one carrier frequency channel, the at least one jamming signal being hopped to at least one additional frequency different from the first frequency to jam at least one additional carrier frequency channel.

DETAILED DESCRIPTION

Figure 1:
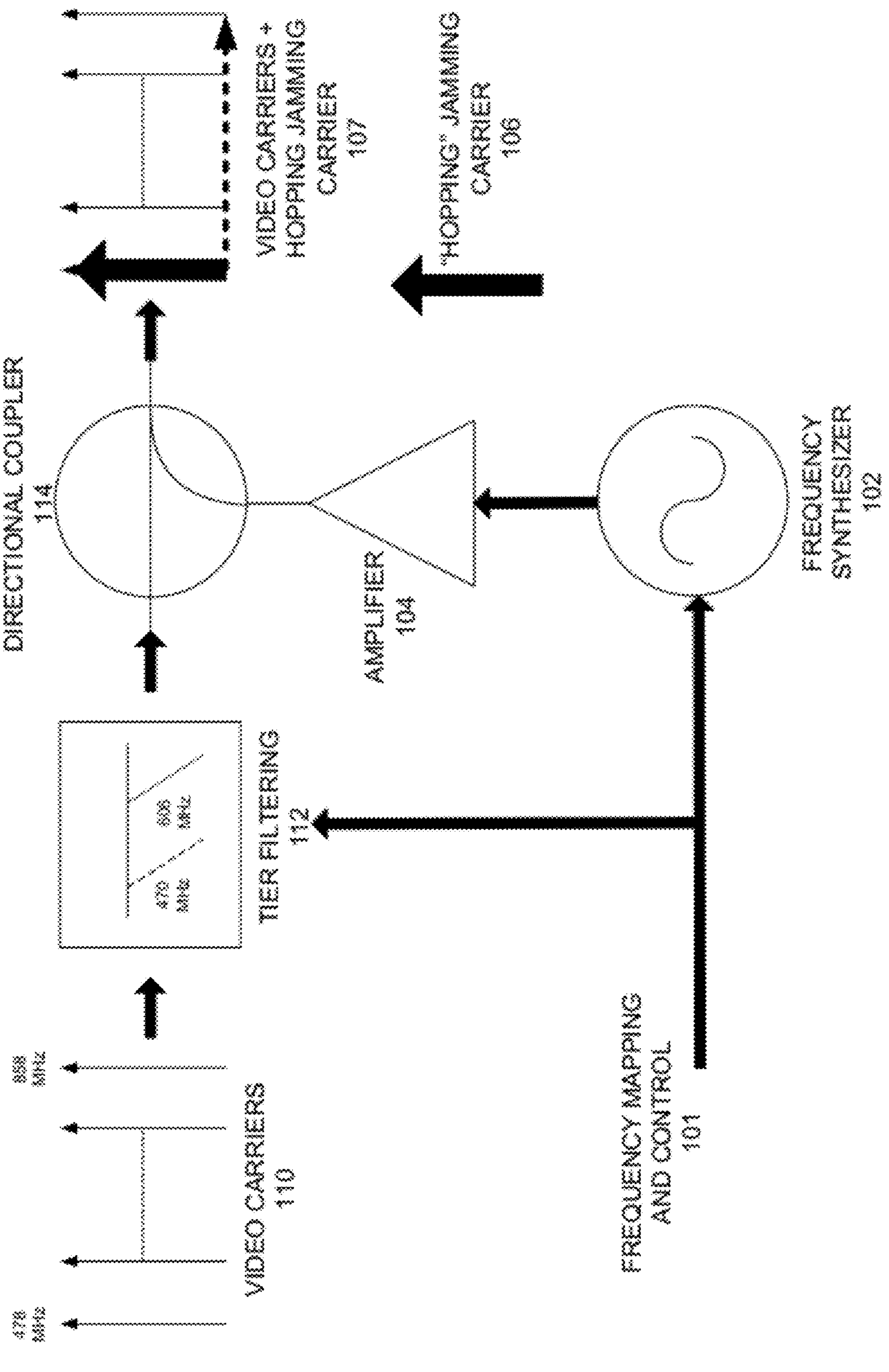
FIG. 1 illustrates a block diagram according to an example embodiment.

It will be readily understood that the components of the example embodiments, as generally described and illustrated in the figures herein, may be arranged and designed in a wide variety of different configurations. Thus, the following detailed description of the embodiments of a method, apparatus, and system, as represented in the attached figures, is not intended to limit the scope of the embodiments as claimed, but is merely representative of selected embodiments.

The features, structures, or characteristics of the disclosure described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments, the embodiments may be applied to many types of network data, such as, packet, frame, datagram, etc. For purposes of this disclosure, the term "message" also includes packet, frame, datagram, and any equivalents thereof. Furthermore, while certain types of messages and signaling are depicted in exemplary embodiments, the embodiments are not limited to a certain type of message, and the embodiments are not limited to a certain type of signaling.

According to example embodiments, frequency hopping may be used to provide jamming on one or more data channel carrier frequencies ($f_{c1}$, $f_{c2}$, $f_{c3}$ . . . $f_{cn}$). According to one example, a single signal or signal frequency may be transmitted or inserted to hop a jamming signal across a group of TV channels, such as a sub-set of all available channels currently being transmitted, or in some instances, all TV channels currently being transmitted. The jamming signal(s) may be hopped across the various frequencies used to provide TV channels often enough that the TV tuner loses its ability to lock into the channel frequencies at a rate high enough to provide a coherent and acceptable picture (audio and/or video) to an end user. In some instances, the jamming signal may yield a video picture that is either non-existent to an end user, or which results in a black screen and/or an intermittent set of picture frames with severe frame blocking, pixilation, freezing, etc.

According to example embodiments, if multiple channels are carried on each digital video broadcasting terrestrial slot (DVB-T) or other TV channel frequency slot then all channels for this particular carrier frequency would either be received or jammed (i.e., no sub-channel jamming capability). In one example, a single frequency synthesizer is used to generate a signal that is hopped across all channels. If one single frequency synthesizer is implemented then there may be a reduced manufacturing cost, however, redundancy is reduced in the event of failure. In this case, if the jamming signal ("jammer") is lost then all blocked channels may begin to be presented to the end user.

In another example, additional frequency synthesizers may be introduced to the jamming procedure. For instance, a second frequency synthesizer could be used to provide increased redundancy so that the TV channel lineup is still limited in the event of a primary signal jammer failure. This may increase the possible time to jam each channel. In one example, the number of channels in a channel lineup is 51. The channel transmission may utilize a maximum Reed-Solomon error burst correction time that is 66 usec (microseconds), which is applied in the ITU-T J.83 standard incorporated herein by reference, but other channel capacities, error burst correction times and related parameters are also applicable.

Other considerations for generating a jamming signal may include a minimum jam dwell time that would be approximately two times the error burst time to restrict the spreading of the signal into two symbols (i.e., dwell time>66 usec). In one example, the minimum jamming level dwell time may be once per second per carrier. If TV tuners have fast clock recovery the rate may need to be increased to repeat a jamming signal at a particular carrier frequency more frequently. The above-noted example parameters and assumptions lead to 20 msec (milliseconds) of available time per channel carrier. This time allocation may include jamming, frequency table reload, tuning to a new carrier, locking to the carrier, settling, etc., to include the known latency contributions.

The spurious and harmonic signal must be about 40 dB below the receiving power level of approximately 20 dBmV. This power level required may be necessary to prevent modulation error rate (MER), carrier to noise ratio (CNR), and bit error rate (BER) degradations for 64 quadrature amplitude modulation (QAM). Other values would also apply for other configuration schemes as would be apparent to one skilled in the art.

Example embodiments may include hardware components used to provide an implementation capable of meeting the frequency generation requirements of the jamming signal. Such an implementation may include a fractional/integer "N" National synthesizer chip, and an operational amplifier (op amp) as part of an active loop filter, and in some example embodiments various additional components and specific configuration values may also be used.

FIG. 1 illustrates a block diagram of a signal configuration according to an example embodiment. Referring to FIG. 1, a frequency mapping and control signal 101 may be provided as input to a frequency synthesizer 102 and tier filtering configuration filter 112. Video carriers 110 are identified as the carrier frequency signals that are used for channel data. According to one example, the frequencies of the video carriers may be within the range of 400 MHz to 900 MHz. The tier filtering filter data 112 provides estimated ranges of carrier frequencies that may be the subject of a jamming carrier frequency signal.

The hopping jamming carrier 106 may be provided as an external signal that is physically added or inserted into the output signal of the optical network termination unit (ONT) (not shown) of a customer's premises. An ONT controller provides a frequency hop map and control signal 101 to the frequency synthesizer 102 to determine which channels to jam and render inoperative. Such a jamming signal may be combined with tier group filters in order to remove complete groups of channels, if necessary.

An amplifier 104 may provide an amplified output signal from the frequency synthesizer 102. The amplifier 104 may be an operational amplifier that is placed at the input to a directional coupler 114. The cut-off frequencies of tier filtering filter 112 included in this example may be at 606 MHz in order to remove all TV channel frequencies above 602 MHz. If all TV channels above 466 MHz are to be blocked then the 470 MHz cutoff frequency for the filter would be selected. If complete groups of channels were removed then the hopping jamming carrier 106 "jammer" signal may dwell longer than the remaining channels per jam cycle interval. In another example, an additional or redundant jammer signal could be introduced to provide a backup for the first jammer signal. The second jammer could be used at an additional cost for increased jamming time and for providing backup in the event of a failure.

Figure 2:
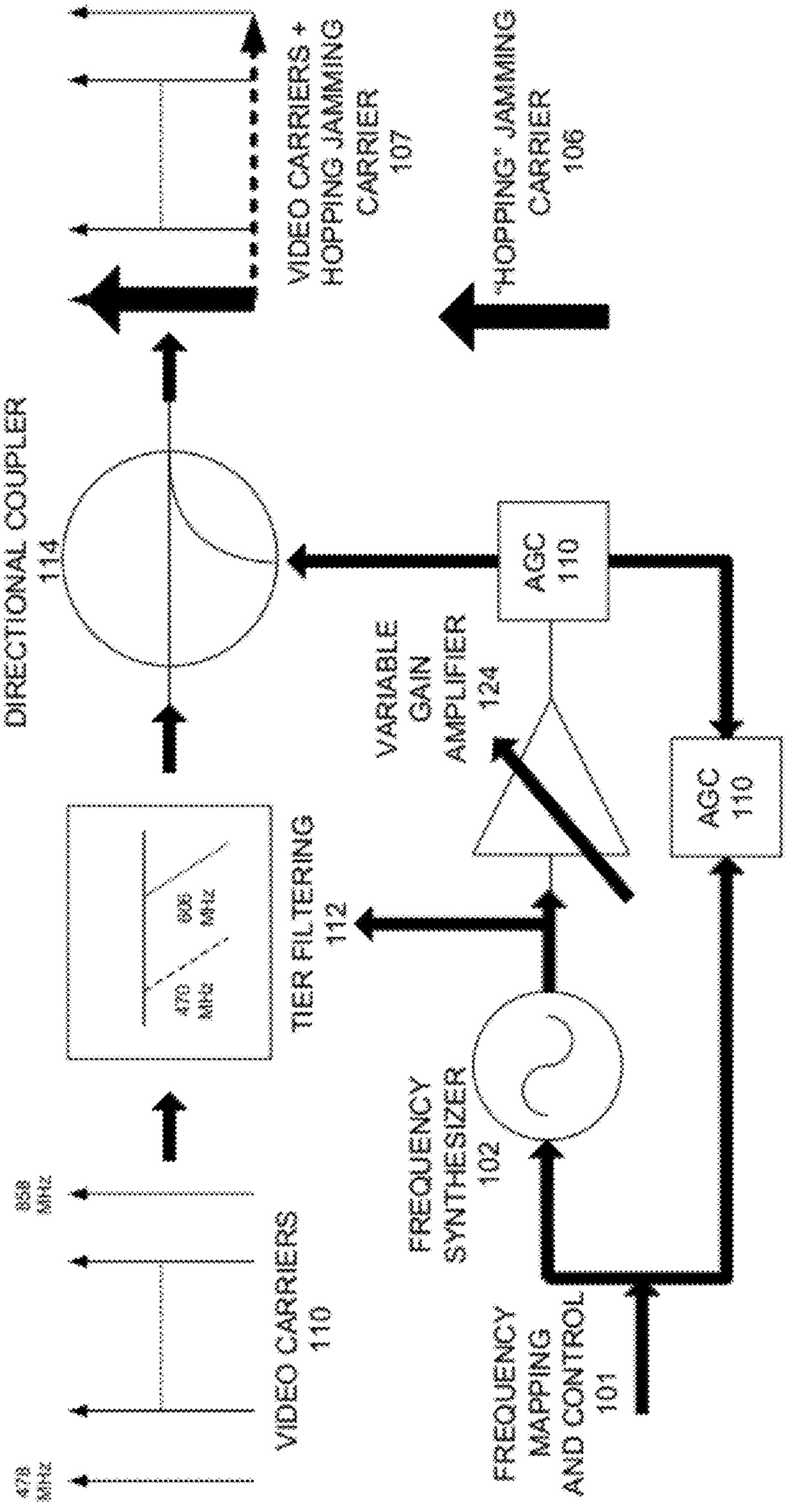
FIG. 2 illustrates another block diagram according to another example embodiment.

FIG. 2 illustrates another block diagram of a jamming signal configuration according to an example embodiment. Referring to FIG. 2, the jamming carrier signal power is sampled at the input to the directional coupler and the amplitude is measured. The measured amplitude is compared against a stored reference level (i.e. the desired amount of jamming power) and an automatic gain control (AGC) loop comprised of one or more AGC units 110 and a variable gain amplifier 124 are initiated to provide added power or amplitude to the measured signal.

The output level of the jamming carrier 106 can then be varied to control the amount of degradation inserted into the video channel. If the output power of the variable gain amplifier 124 is not sufficient, the AGC unit (s) 110 may automatically detect a lagging power level of the jamming carrier signal and instruct the variable gain amplifier 124 to provide additional power to the jamming signal.

Controlling the jamming carrier signal dwell time and the amplitude of the jamming carrier signal may cause the level of video degradation to be variable. For example, in the case of a digital video carrier the BER could be adjusted such that no image was possible or a very intermittent image is created. The sampled jamming power of the jamming carrier signal could also be utilized to determine if the frequency synthesizer has failed, in which case an alarm may be triggered. Additionally, if, for example, the carrier modulation scheme changed to 256 QAM for example, the jamming power could be adjusted to accommodate a different BER requirement than originally selected.

According to example embodiments, a video channel security mechanism is placed in a passive optical network (PON) termination unit, such as the optical network unit (ONT). Controlling the ONT security is performed over data network signaling and controlling mechanisms, such as messages or data packets being transmitted across the communication medium to initiate the security controls. This approach allows the operator to control the video supplied to every subscriber household individually and "on the fly" without the need for the technician to visit the customer sites and perform expensive and time consuming tasks. The operator could additionally monitor the downstream video decoder lock status via ONT data network signaling and control mechanisms to confirm the loss in video signals for blocked television channels.

The data messages may be created and sent from an optical line termination (OLT) or central office, which deliberately cause bit errors to occur in the received data that is streamed to the customer site (ONT). The bit errors may be frequent enough to either create a greatly impaired image or to completely block an image. In general, digital TV signals have known levels of Reed-Solomon error correction included within the TV signals themselves. Adjusting the time duration of the jamming signal to overcome the error correction capability (i.e. exceed the built-in "impulse noise" correction capability) may require a specific dwell time or hopping occurrence rate to properly jam a TV signal at a particular carrier frequency.

Figure 5:
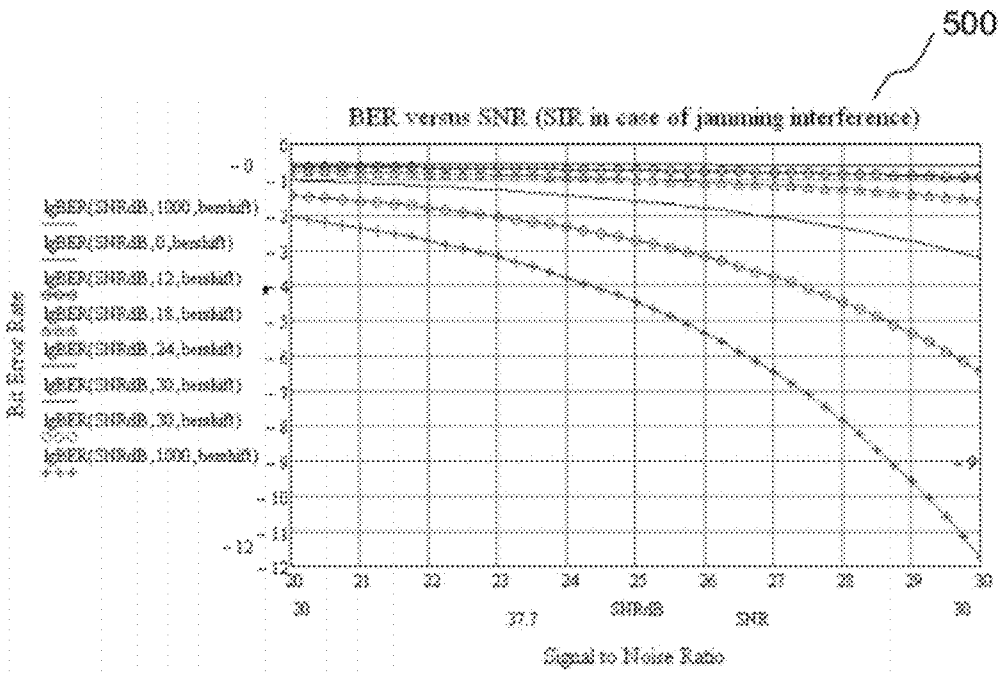
FIG. 5 illustrates a graph of BER vs. SNR for a plurality of different interference levels.

The error correction capability of the TV signal may be overcome by adjusting the dwell time of the jamming carrier as explained above. However, the resulting bit error rate (BER) that occurs during the jamming cycle can be controlled by controlling the amplitude of the jamming carrier with the variable gain amplifier 124. The adjustment of the jamming carrier signal amplitude can be set to specific desired BER values by the signal to interference ratio created (SIR or SNR). For example, a 64 QAM signal requires a signal to noise ratio (SNR) of about 28.75 dB in order to provide a BER of 1E-9 (one error every 1 billion bits). If an artificial noise or jamming carrier is injected onto that TV carrier at an SIR of 24 dB, the BER would degrade from 1E-9 to worse than 1E-3 (one error every thousand bits). For an SIR of 18 dB the BER would degrade from 1E-9 to worse than 1E-2 (1 error every 100 bits). The BER versus various levels of SNR (or SIR) are displayed in the graph 500 of FIG. 5. In this example, interference levels of 0, 12, 18, 24, 30, 1000 dB are shown as BER curves (y-axis) versus a given SNR (x-axis). The two BERs that show relatively larger changes are those with an injected interference level of 30 and above. For example, for the interference level of 30 (circle patterned line), the SNRdb begins dropping noticeably faster than the previous interference levels of 0 to 24. Similarly, for an interference level of 1000, the SNRdb drops much quicker as indicated by the plus symbol patterned line.

Quadrature amplitude modulation (QAM) TV tuners and set top decoder boxes (STBs) are often not tolerant to rapid shifts in input signal amplitude. There are certain instances where cyclical changes of as little as 0.2 dB can cause bit errors in the output data stream and result in video pixilation of the image resulting in customer complaints. For example, when the jamming signal is set equal to an amplitude of a receive signal, the power provided into the tuner will momentarily (i.e., during the jamming period) increase by 3 dB. This 3 dB increase will not be easily tracked by the tuner equalizer and the receive QAM constellation will be unrecoverable due to clipping until the gain scaling can be adjusted to compensate, which is not generally a real-time process. As a result, the ability to generate a known and specific impairment level for a customer may be calculated based on a simple power addition expression of the jamming carrier signal to the desired signal carrier 107.

One example approach may be implemented by setting a fixed SIR through the choice of a fixed amplifier gain value as is illustrated in FIG. 1. In this approach, video network operators may freely transmit all TV signals "in the clear" from the head end office or OLT. This allows operators to use fewer channel carrier signals when providing addressable video content resulting in a cost savings in the head end equipment. This approach also integrates the video security function into the ONT of the customer premises. Hence a subscriber does not require the use of a set top box in the household since all channels will be provided together and certain ones will be selectively made unavailable via the jamming signal insertion approach. This approach saves operating costs by not requiring one or more set top boxes at the subscriber premises. The ONT serves as a video security device for the entire premises.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network element 300, which may represent any of the above-described network components of FIGS. 1 and 2.

Figure 3:
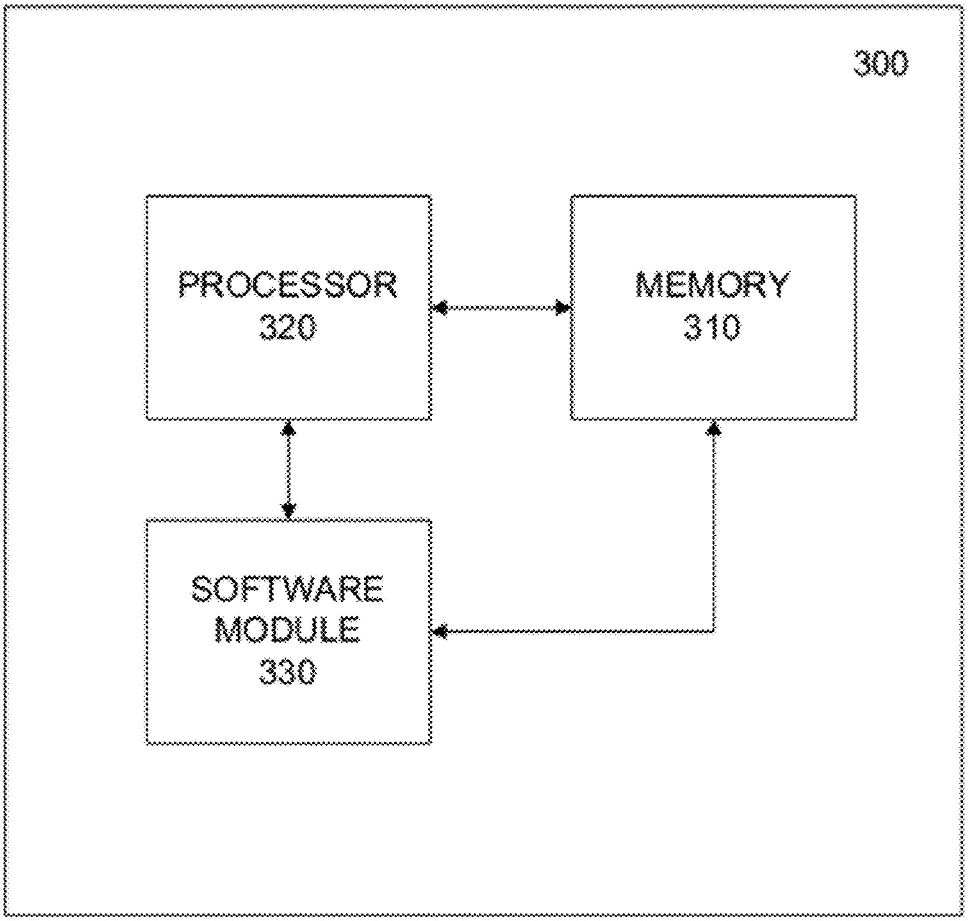
FIG. 3 illustrates an example network entity device configured to store instructions, software, and including corresponding hardware for performing various operations, according to example embodiments.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
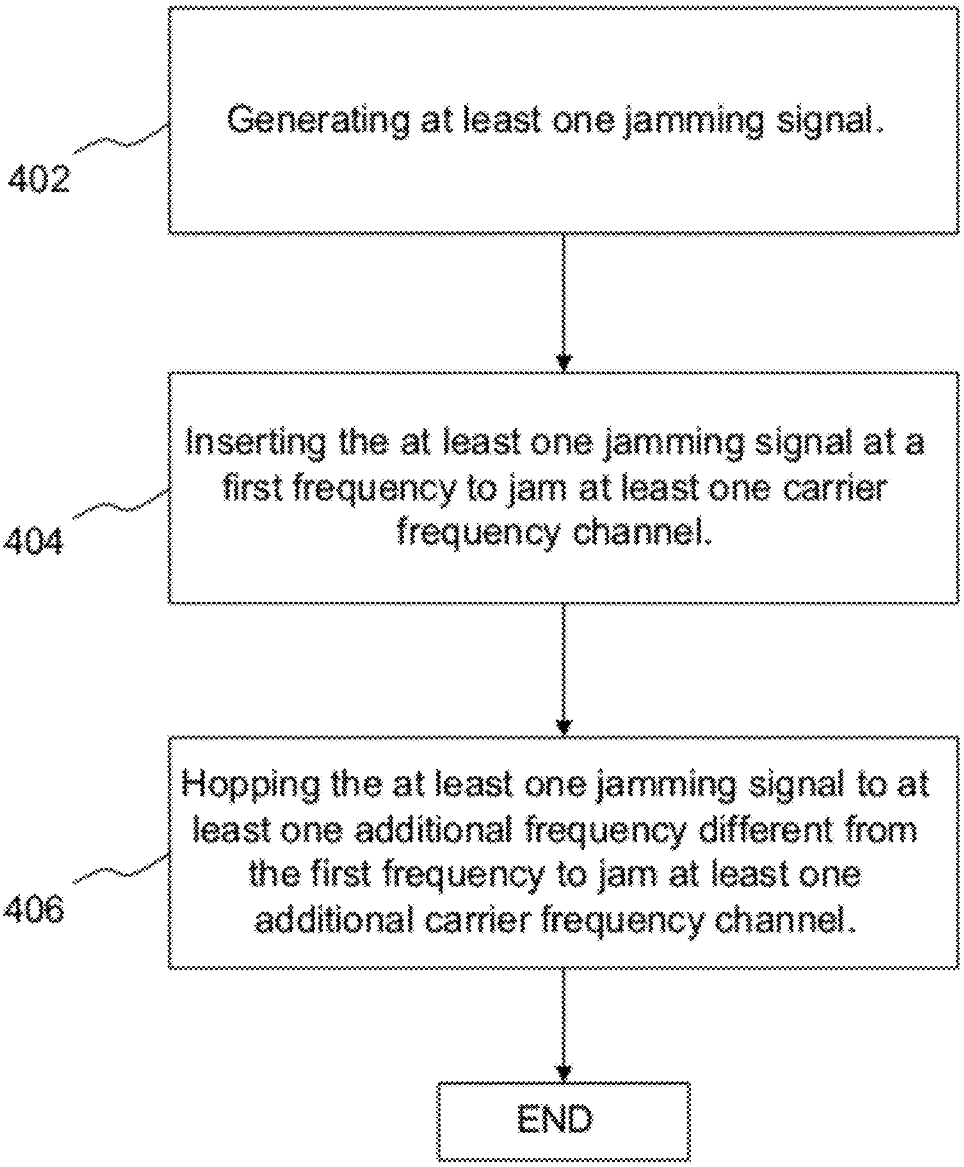
FIG. 4 illustrates a flow diagram of an example method of operation, according to example embodiments.

One example method of operation may include a method of FIG. 4. The method of FIG. 4 may include disabling data channels at a customer premises by generating at least one jamming signal at operation 402, and inserting the at least one jamming signal at a first frequency to jam at least one carrier frequency channel at operation 404. The method may also include hopping the at least one jamming signal to at least one additional frequency different from the first frequency to jam at least one additional carrier frequency channel at operation 406.

While preferred embodiments have been described, it is to be understood that the embodiments described are illustrative only and the scope of the embodiments is to be defined solely by the appended claims when considered with a full range of equivalents and modifications (e.g., protocols, hardware devices, software platforms etc.) thereto.

What is claimed is:

1. A method of disabling data channels at a customer premises, the method comprising:

generating at least one jamming signal;

inserting the at least one jamming signal at a first frequency to jam at least one carrier frequency channel;

hopping the at least one jamming signal to at least one additional frequency different from the first frequency to jam at least one additional carrier frequency channel, wherein the at least one jamming signal is hopped along each of a plurality of carrier frequency channels to jam each of the plurality of carrier frequency channels; and repeating the hopping of the at least one jamming signal along each of the plurality of carrier frequency channels frequently enough to prevent each of a plurality of corresponding channels from being locked onto by a tuner at the customer premises.

2. The method of claim 1, wherein the at least one jamming signal is a frequency hopping jamming signal.

3. The method of claim 1, wherein the repeating of the hopping of the at least one jamming signal causes each of the plurality of channels from being presented to an end user by causing at least one of a black screen, intermittent picture frames, pixilation, and picture frame freezing.

4. The method of claim 1, wherein a predetermined frequency hop list of the carrier frequencies to be blocked is compiled and provided to a frequency synthesizer prior to the carrier frequencies being blocked by the at least one jamming signal generated by the frequency synthesizer.

5. The method of claim 1, further comprising:
- generating at least one additional jamming signal to provide at least one of a second jamming signal inserted with the at least one jamming signal and a redundant jamming signal that is inserted when the at least one jamming signal fails.

6. The apparatus of claim 1, wherein a predetermined frequency hop list of the carrier frequencies to be blocked is compiled and provided to the frequency synthesizer prior to the carrier frequencies being blocked by the at least one jamming signal generated by the frequency synthesizer.

7. The apparatus of claim 1, wherein the transmitter is configured to transmit at least one additional jamming signal to provide at least one of a second jamming signal inserted with the at least one jamming signal and a redundant jamming signal that is inserted when the at least one jamming signal fails.

8. The non-transitory computer readable storage medium of claim 1, wherein a predetermined frequency hop list of the carrier frequencies to be blocked is compiled and provided to a frequency synthesizer prior to the carrier frequencies being blocked by the at least one jamming signal generated by the frequency synthesizer.

9. An apparatus configured to disable data channels at a customer premises, the apparatus comprising:
- a frequency synthesizer configured to generate at least one jamming signal;
- an amplifier configured to increase a power level of the jamming signal; and
- a transmitter configured to transmit the at least one jamming signal at a first frequency to jam at least one carrier frequency channel, the at least one jamming signal being hopped to at least one additional frequency different from the first frequency to jam at least one additional carrier frequency channel, wherein the at least one jamming signal is hopped along each of a plurality of carrier frequency channels to jam each of the plurality of carrier frequency channels, and wherein transmitter repeats the hopping of the at least one jamming signal along each of the plurality of carrier frequency channels frequently enough to prevent each of a plurality of corresponding channels from being locked onto by a tuner at the customer premises.

10. The apparatus of claim 9, wherein the at least one jamming signal is a frequency hopping jamming signal.

11. The apparatus of claim 9, wherein the repeated transmission of the at least one jamming signal causes each of the plurality of channels from being presented to an end user by causing at least one of a black screen, intermittent picture frames, pixilation, and picture frame freezing.

12. A non-transitory computer readable storage medium configured to store instructions that when executed cause a processor to perform disabling data channels at a customer premises, the processor being further configured to perform:
- generating at least one jamming signal;
- inserting the at least one jamming signal at a first frequency to jam at least one carrier frequency channel;
- hopping the at least one jamming signal to at least one additional frequency different from the first frequency to jam at least one additional carrier frequency channel, wherein the at least one jamming signal is hopped along each of a plurality of carrier frequency channels to jam each of the plurality of carrier frequency channels; and
- repeating the hopping of the at least one jamming signal along each of the plurality of carrier frequency channels frequently enough to prevent each of a plurality of corresponding channels from being locked onto by a tuner at the customer premises.

13. The non-transitory computer readable storage medium of claim 12, wherein the at least one jamming signal is a frequency hopping jamming signal.

14. The non-transitory computer readable storage medium of claim 12, wherein the repeating of the hopping of the at least one jamming signal causes each of the plurality of channels from being presented to an end user by causing at least one of a black screen, intermittent picture frames, pixilation, and picture frame freezing.

* * * * *